US012718776B2

(12) United States Patent
Hsuan et al.

(10) Patent No.: US 12,718,776 B2
(45) Date of Patent: Aug. 25, 2026

(54) IMAGE STICKING PREVENTION METHOD AND SYSTEM

(71) Applicant: TOSHIBA GLOBAL COMMERCE SOLUTIONS, INC., Durham, NC (US)

(72) Inventors: Wei-Yi Hsuan, Taipei City (TW); Yihsin Huang, Taipei City (TW); Wen-Fu Tsai, New Taipei City (TW); Yin-Chen Chou, New Taipei City (TW)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/632,031

(22) Filed: Apr. 10, 2024

(65) Prior Publication Data

US 2025/0322801 A1 Oct. 16, 2025

(51) Int. Cl.
*G09G 3/34* (2006.01)
*G09G 3/36* (2006.01)

(52) U.S. Cl.
CPC ........... *G09G 3/342* (2013.01); *G09G 3/3607* (2013.01); *G09G 2320/0257* (2013.01); *G09G 2320/046* (2013.01); *G09G 2330/027* (2013.01)

(58) Field of Classification Search
None
See application file for complete search history.

(56) References Cited

U.S. PATENT DOCUMENTS

| | | | | |
|---|---|---|---|---|
| 11,545,090 B1 * | 1/2023 | Kim | G09G 3/3233 | |
| 2005/0140827 A1 | 6/2005 | Kim | | |
| 2010/0245339 A1 | 9/2010 | Lin | | |
| 2011/0273482 A1 * | 11/2011 | Massart | G09G 3/20 | 345/690 |
| 2014/0375704 A1 * | 12/2014 | Bi | G09G 3/3275 | 345/694 |
| 2015/0161936 A1 * | 6/2015 | Jang | G09G 3/20 | 345/214 |
| 2017/0004753 A1 * | 1/2017 | Kim | G09G 3/3233 | |
| 2019/0295493 A1 * | 9/2019 | Zhong | G06F 9/30 | |
| 2024/0312402 A1 * | 9/2024 | Lim | G09G 3/3208 | |

FOREIGN PATENT DOCUMENTS

| | | | |
|---|---|---|---|
| CN | 114217895 A * | 3/2022 | G06F 9/451 |
| CN | 114664256 A * | 6/2022 | |

* cited by examiner

*Primary Examiner* — Kirk W Hermann
(74) *Attorney, Agent, or Firm* — Patterson + Sheridan, LLP; Gero G. McClellan

(57) ABSTRACT

Embodiments herein describe techniques for mitigating or preventing image sticking in a display screen (e.g., a LCD or plasma display). In one embodiment, the pixels in the display screen are assigned to different groups. During a first time period, the display turns off a subset of the pixels in each of the groups. De-energizing the pixel mitigates or removes the reversed voltage that creates image sticking. During another time period, another subset of pixels in each of the groups is de-energized while the pixels that were de-energized in the previous time period are energized.

20 Claims, 6 Drawing Sheets

IMAGE STICKING PREVENTION METHOD AND SYSTEM

BACKGROUND

If a fixed image remains on a LCD (liquid crystal display) or plasma display for a long period of time, the faint outline of that image will persist on the screen for some time before it finally disappears, which is referred to as image sticking. Image sticking occurs on LCD and plasma screens and is also referred to as "image persistence", "image retention", "ghosting" or "burn-in image." The cause of LCD image sticking is due to an accumulation of ionic impurities inside the liquid crystal materials. When slight DC voltage occurs, the charged impurities build up a reversed voltage field. When the power is removed, the reversed voltage makes the LCD molecules twist differently from the other parts of the LCD, which shows up as the image sticking. The longer the time, the more impurities will migrate, the larger the reversed voltage will be, and the imaging sticking appears worse.

DETAILED DESCRIPTION

Embodiments herein describe techniques for mitigating or preventing image sticking in a display screen (e.g., a LCD or plasma display). In one embodiment, the pixels in the display screen are assigned to different groups (e.g., square blocks of 50 pixels). During Time A, the display turns off one or more of the pixels in each of the groups (e.g., one pixel out of 50 are turned off). De-energizing the pixel mitigates or removes the reversed voltage that creates image sticking. During Time B, another pixel in each of the groups is de-energized while the pixels that were de-energized at Time A are reenergized. This can continue until each pixel in the groups is de-energized for a period time. Nonetheless, in this example, 1 out of 50 pixels in the display is de-energized or turned off during any given time period.

In one embodiment, the image sticking prevention technique is performed selectively. For example, a video controller in the display may determine when the display is susceptible to image sticking and then activate the technique. For example, if the display has shown the same image for a predefined amount of time, it may start the technique. If the display changes the image, the video controller can stop the technique.

Advantages of Preventing Image Sticking

By assigning pixels into groups and iteratively de-energizing (or deactivating or turning off) a subset of the pixels in that group, the embodiments herein can mitigate image sticking. This can improve the operation of a display device by enabling it to display images for long periods of time, and then display different images, without remnants of the previous images "sticking" on the display. Moreover, the embodiments herein can conserve power relative to other prior techniques for solving image sticking (such as shifting the image) since different pixels are de-energized. Moreover, the embodiments herein can provide advantages with point of sale (POS) devices since prior techniques, such as shifting the image, can result in the user pressing the wrong area on a touchscreen display.

Figure 1:
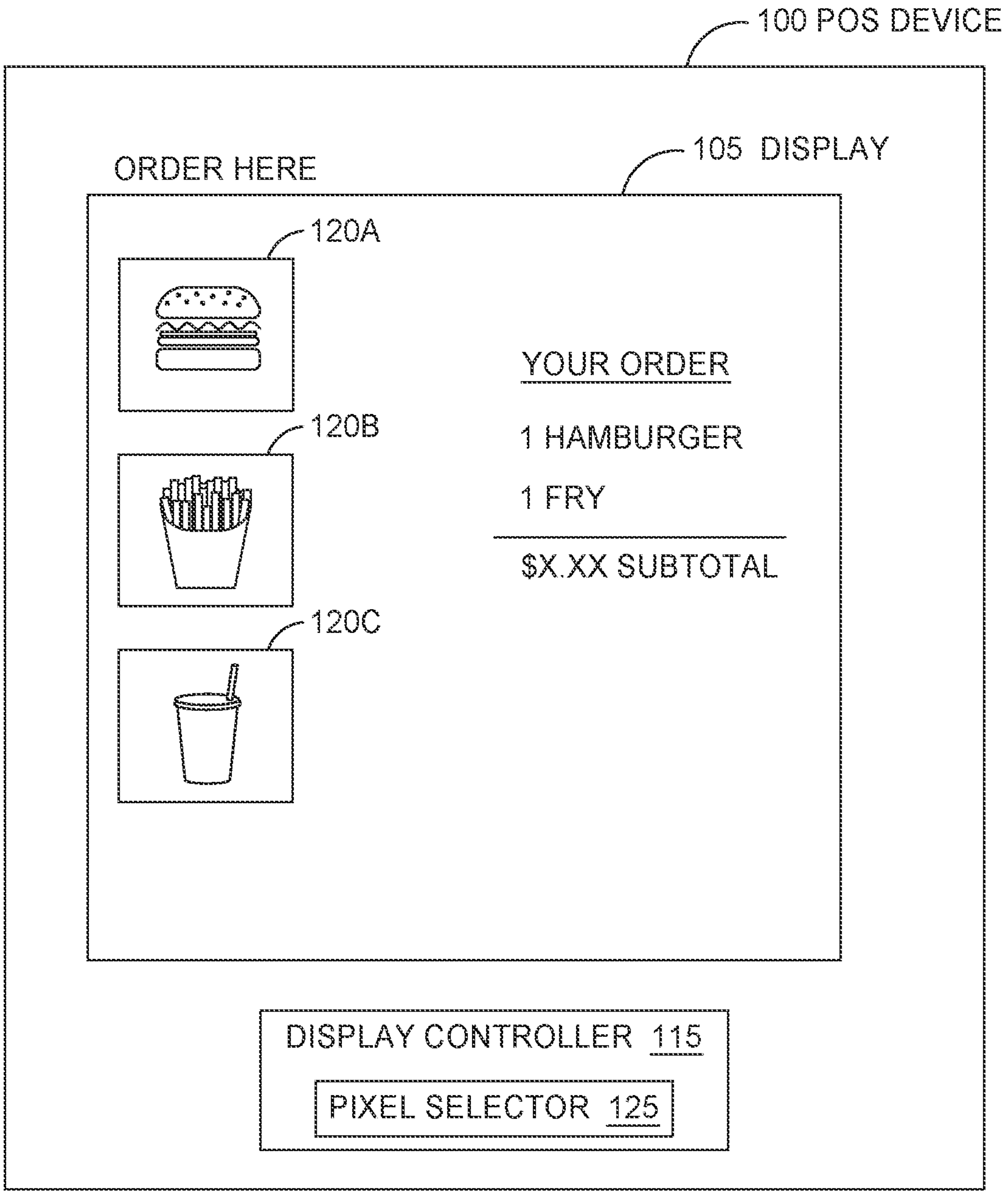
FIG. 1 illustrates a point of sale (POS) device that can prevent image sticking, according to one embodiment.

FIG. 1 illustrates a POS device 100 that can prevent image sticking, according to one embodiment. The POS device 100 includes a display 105 (e.g., a touchscreen display such as a LCD touchscreen display) and a display controller 115. In this example, the display 105 displays an interactive graphical user interface (GUI) for a restaurant. As shown, the GUI displays food items using interactive buttons 120A-C. A user can press one of the buttons 120A-C to order the corresponding food item. In this example, the user has selected buttons 120A and 120B to order a hamburger and fries. The customer's order is shown on the right side of the display 105. The GUI could include other buttons such as buttons to change the order, increase the number of food items, navigate to different menus, checkout, and the like.

The display controller 115 can include hardware, software, firmware, and combinations thereof. In one embodiment, the display controller 115 can receive display data from a host computer that can include a processor (e.g., a central process unit (CPU)), video card, and the like. The display controller 115 can use the display data to display the GUI on the display 105.

The display controller 115 (e.g., a display scalar) includes a pixel selector 125 that can be used to perform techniques for mitigating or preventing image sticking. In one embodiment, the pixels are divided into groups of pixels (e.g., blocks of pixels formed from rows and columns of pixels). The determination of how to group the pixels into groups could be done when the display was manufactured, or could be done by the display controller 115 when the display is first powered on.

In one embodiment, the pixel selector 125 (e.g., hardware, software, firmware, or combinations thereof) de-energizes one or more pixels (i.e., a subset) in each group at any given time. For example, if there are fifty pixels in each group, the pixel selector 125 can de-energize one pixel in each of the groups in parallel for a period of time. Once that time has expired, the pixel selector 125 can re-energize the pixels that were de-energized and select a different one or more pixels (a different subset) in each group to de-energize. This can continue until all the pixels in the groups have been de-energized (e.g., 50 cycles). The pixel selector 125 can then start over with de-energizing the pixels that were de-energized first. This process is described in more detail in FIG. 2.

While FIG. 1 illustrates the logic for preventing image sticking (i.e., the pixel selector 125) being in the display controller 115, in another embodiment, this logic may be performed by the video card or some other component within the host computing system.

Moreover, the POS device 100 can include other elements not shown in FIG. 1, such as input/output elements, card readers, cameras, speakers, etc. Additionally, the POS device 100 could be integrated into a larger POS system such as a self-checkout lane in a store. For example, the POS device 100 could be a display system for a self-checkout lane that includes a bagging area, scanner, and the like.

FIG. 1 illustrates a POS device, but the embodiments discussed herein can be used on any LCD display. For example, the techniques described herein for preventing image sticking can be used for LCD displays in other applications where the same image may be displayed for long period of times. Non-limiting examples can include display screens used to display advertisements or for store-fronts, or LCD panels that display directions or information in hotels, transportation hubs, convention centers, and the like.

Figure 2:
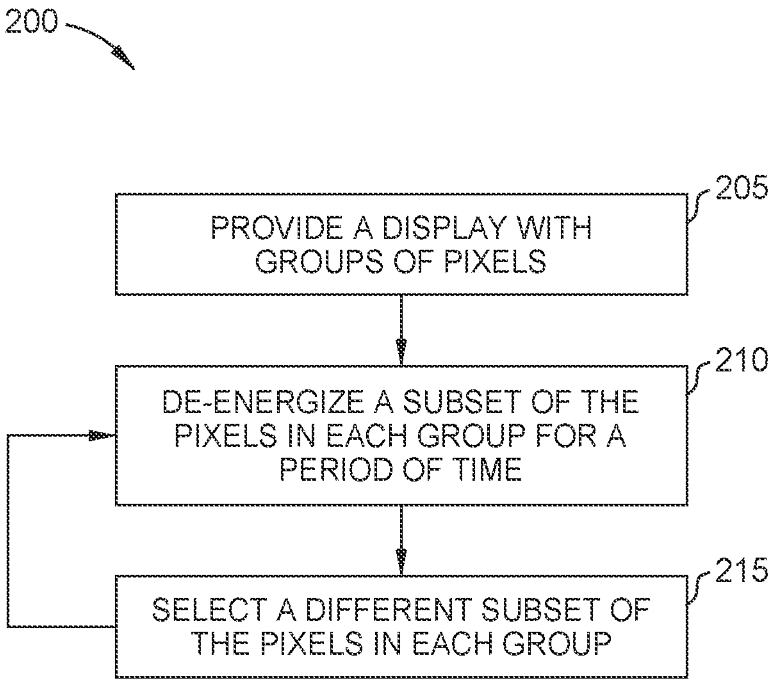
FIG. 2 is a flowchart for preventing image sticking, according to one embodiment.

FIG. 2 is a flowchart of a method 200 for preventing image sticking, according to one embodiment. For ease of explanation, the blocks of method 200 are discussed in tandem with FIG. 3 and FIGS. 4A-4C.

At block 205, a display is provided where the pixels in the display are divided into (or assigned into) a plurality of groups. The size of the groups can vary. The groups could be blocks that include multiple columns and rows, but could also be a single column or a single row. In one embodiment, each pixel in the display may be assigned to a group. However, in other implementations, some pixels may not be assigned to a group, and thus, do not participate in the image sticking prevention techniques described below. For example, there may be positions of the LCD panel where image sticking is not a problem because the information being displayed at those locations changes frequently, and thus, is not susceptible to image sticking. As such, the method 200 can be applied to every pixel on the display or to a sub-portion of the pixels.

Figure 3:
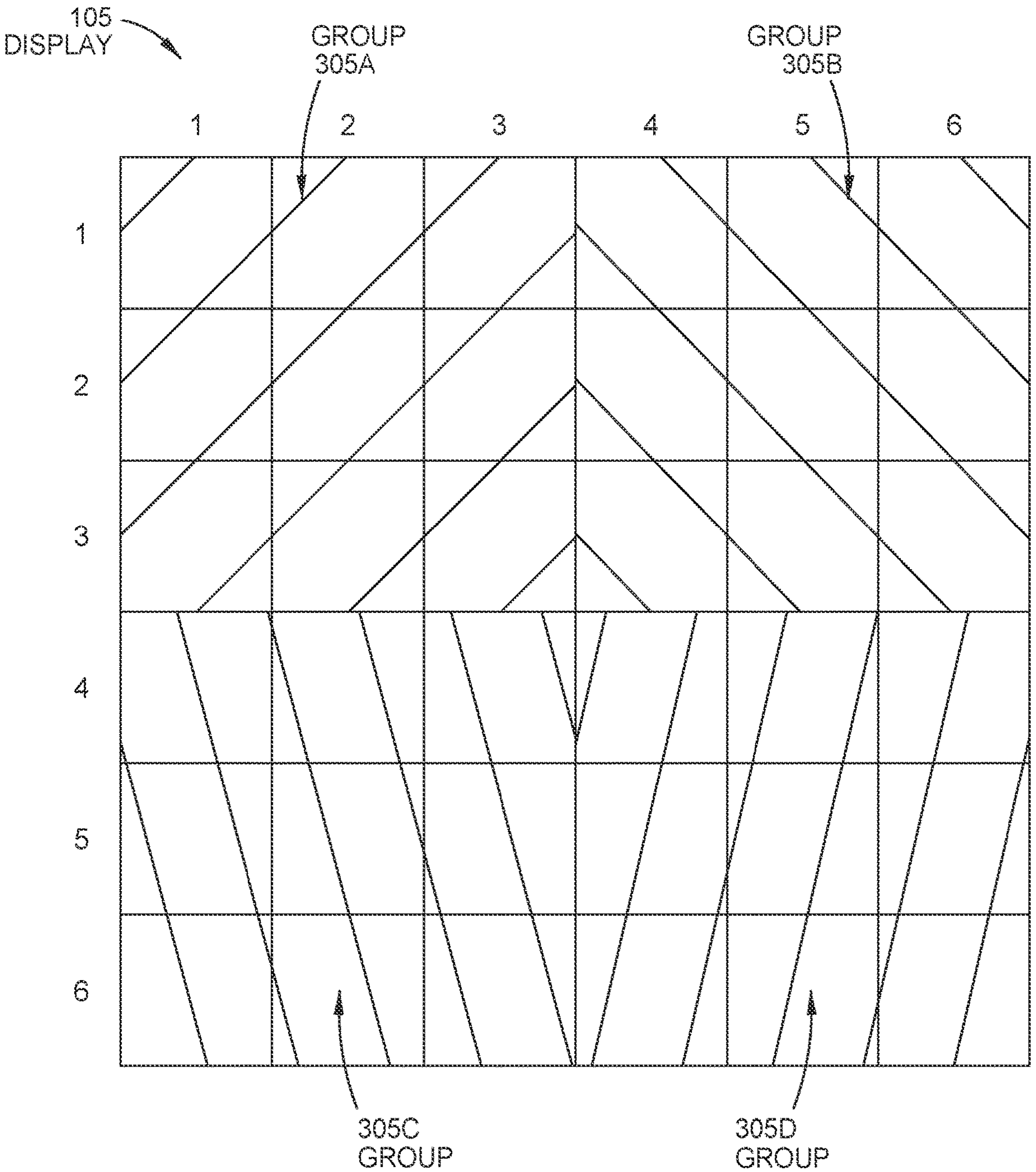
FIG. 3 illustrates identifying groups of pixels in a display, according to one embodiment.

FIG. 3 illustrates identifying groups of pixels in the display 105, according to one embodiment. That is, FIG. 3 illustrates one implementation of dividing the pixels in a display into different groups.

In this simplified illustration, the display 105 includes six columns of pixels (labeled 1-6) and six rows of pixels (labeled 1-6). The display has been divided up into four groups: groups 305A-305D. Group 305A includes the nine pixels in rows 1-3 and columns 1-3, group 305B includes the nine pixels in rows 1-3 and columns 4-6, group 305C includes the nine pixels in rows 4-6 and columns 1-3, and group 305D includes the nine pixels in rows 4-6 and columns 4-6.

In FIG. 3, each pixel is assigned to a group, however, as mentioned above, this is not a requirement. Moreover, the groups 305 are non-overlapping such that a pixel is assigned to at most one group.

Further, the size of the groups can vary, and the arrangement of the groups can vary. While FIG. 3 illustrates the groups 305 contacting each other, in other embodiments there may be a row or column of pixels which are not assigned to any group that separates the groups 305 from each other. These pixels may not be de-energized as discussed in the method 200 in FIG. 2.

Returning to the method 200, at block 210 the pixel selector de-energizes a subset of the pixels in each group for a period of time. This subset can be one pixel in each group, two pixels in each group, three pixels in each group, or any number of pixels that is less than the total number of pixels in the group. Further, if multiple pixels in the same group are de-energized at the same time, these pixels may be neighboring pixels (e.g., directly contacting) or may be separated from each other by pixels that remain energized.

By performing the method 200, even though the display data may indicate that the de-energized pixel should be energized in order to display a desired image, the pixel selector overrides (or ignores) the display data provided by the host computing device and de-energizes the pixel. As such, the embodiments herein use the pixel selector to force pixels in the display to de-energize even though these pixels are part of the image, and under normal operating conditions, would be energized in order to display the image.

Figure 4A:
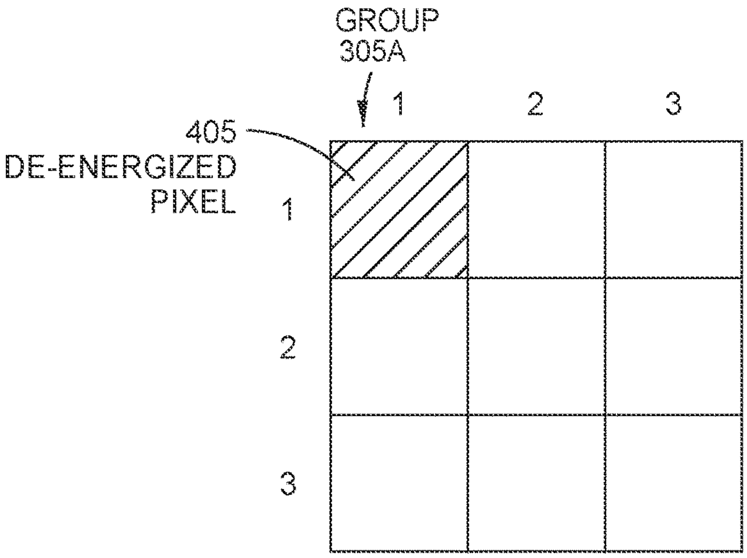
FIGS. 4A-4C illustrate de-energizing pixels in a group, according to one embodiment.

FIG. 4A illustrate de-energizing a pixel in the group 305A shown in FIG. 3. As shown, one of the nine pixels in group 305A is de-energized while the remaining eight pixels remain powered. That is, the de-energized pixel 405 is unpowered—i.e., is deactivated. The pixel selector can do the same thing in the other groups 305B-D such that at least one of their pixels is de-energized.

De-energizing the pixel mitigates or prevent image sticking. For example, de-energizing the pixel 405 stops (and can reverse) the accumulation of ionic impurities inside the liquid crystal materials. De-energizing the pixel can mitigate or remove the reversed voltage that creates image sticking.

Returning to method 200, at block 215 the pixel selector selects a different subset of pixels in each group to de-energize after the time period has expired. Put differently, the pixels that were de-energized at block 210 are re-energized and another subset of pixels in the groups are de-energized for a second period of time. The pixel selector can de-energize the same number of pixels each cycle, or can de-energize different numbers of the pixels in each group. Further, the pixels may be de-energized for the same period of time during each cycle or using different periods of time.

Figure 4B:
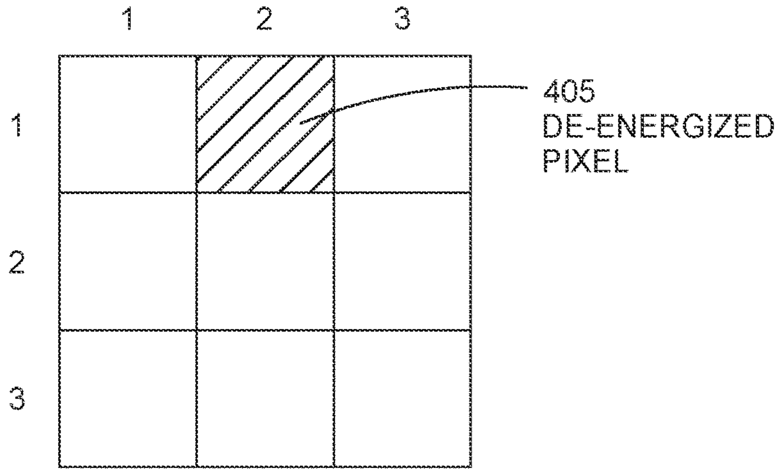
Figure 4C:
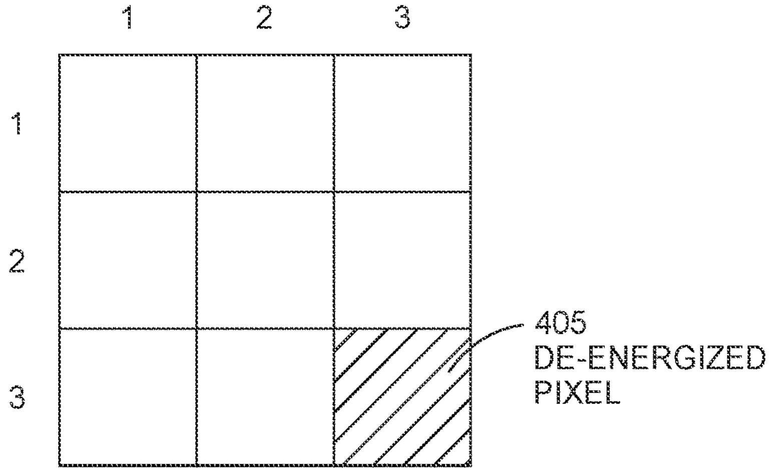

FIGS. 4B and 4C illustrate de-energizing pixels in a group, according to one embodiment. In FIG. 4B, the pixel selector de-energizes the pixel at row 2, column 2, which neighbored the pixel that was de-energized in FIG. 4A. For example, the pixel selector may move row-by-row (or column-by-column) de-energizing the pixels. However, in other embodiments, the pixel selector may move around in different patterns when selecting the next pixel to de-energize. For example, the pixel selector could skip every other pixel or move around in some other pattern.

FIG. 4C illustrates that the pixel selector can de-energize each pixel in the group 305A until the last pixel is the de-energized pixel 405. The method 200 can then repeat where the first pixel is de-energized in the next cycle, as shown in FIG. 4A. In this manner, the pixel selector can continue to select a different subset of pixels to de-energize in each group in each cycle. Once each pixel has been de-energized, the pattern can repeat.

Figure 5:
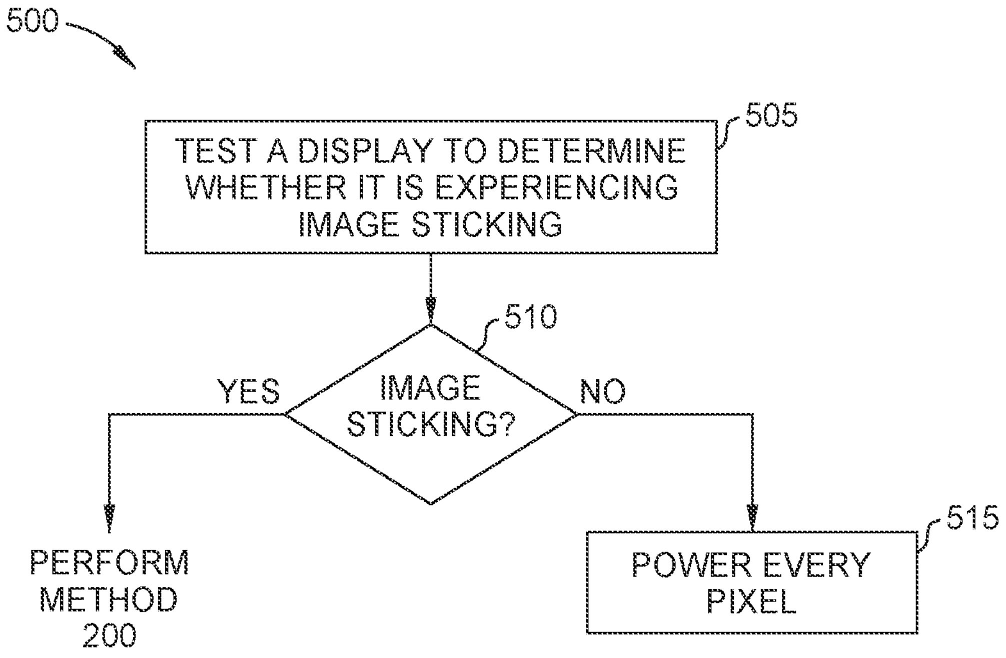
FIG. 5 is a flowchart for selectively activating an image sticking prevention algorithm, according to one embodiment.

FIG. 5 is a flowchart of a method 500 for selectively activating an image sticking prevention algorithm, according to one embodiment. The method 500 may be used to select when to perform the image sticking prevention techniques described above, and when not to perform those techniques. For example, a display controller or a video card/controller may determine when a display has a state that is susceptible to image sticking and then activate the method 200. When the state has changed, the display controller can stop performing the image sticking prevention algorithm.

At block 505, the display controller tests the display to determine whether it is experiencing image sticking. For example, a video camera can be used to monitor the display to determine when image sticking occurs. Or the display controller may be able to measure the accumulation of ionic impurities inside the liquid crystal materials. If the ionic impurities reaches a threshold level, the display controller can predict that image sticking will occur.

In another embodiment, the display controller can monitor how long an image has been displayed on the display, or how long the same voltage has been used to drive the pixels (or a subset of the pixels). For example, even if the display controller is changing images, some of the pixels in the display may display the same colors in each of the images, and thus, have the same voltage applied to them. Using FIG. 1 as an example, the GUI being displayed may vary as customers interact with the POS display, which can change the overall GUI. However, portions of the GUI may remain the same. For example, as the user selects the buttons 120A-C, the pixels in the right of the GUI display different information (e.g., the items being ordered, the subtotal, etc.). However, the buttons 120A-C may not change as customers use the POS device to place their orders. As such, the pixels displaying the buttons 120A-C may experience image sticking when the image is eventually changed at those locations, while the pixels on the right side of the display do not.

The display controller can monitor each pixel or groups of pixels to determine when they are susceptible to image sticking. For instance, the display controller can determine that the image sticking prevention techniques described above should be performed on the subset of the pixels which are at risk of image sticking.

At block 510, if the display controller determines all or some of the display is experiencing image sticking (or likely to experience image sticking), the method 500 proceeds to method 200 in FIG. 2 where subsets of pixels in the plurality of groups are de-energized over a number of cycles.

However, if the display controller determines that the display is not experiencing image sticking, the method 500 proceeds to block 515 where the display controller powers every pixel in the display.

The advantage of selectively performing the image sticking prevention algorithms in method 200 is that the display can have a greater display brightness. For example, when de-energizing the subset of pixels in method 200, this reduces the brightness of the display which may make it harder for the users to see the displayed GUI, especially in brighter environments. However, by detecting that a display is not experiencing image sticking (or is likely not experiencing image sticking), the display controller can power every pixel so that the full brightness of the LCD panel is achieved.

Figure 6:
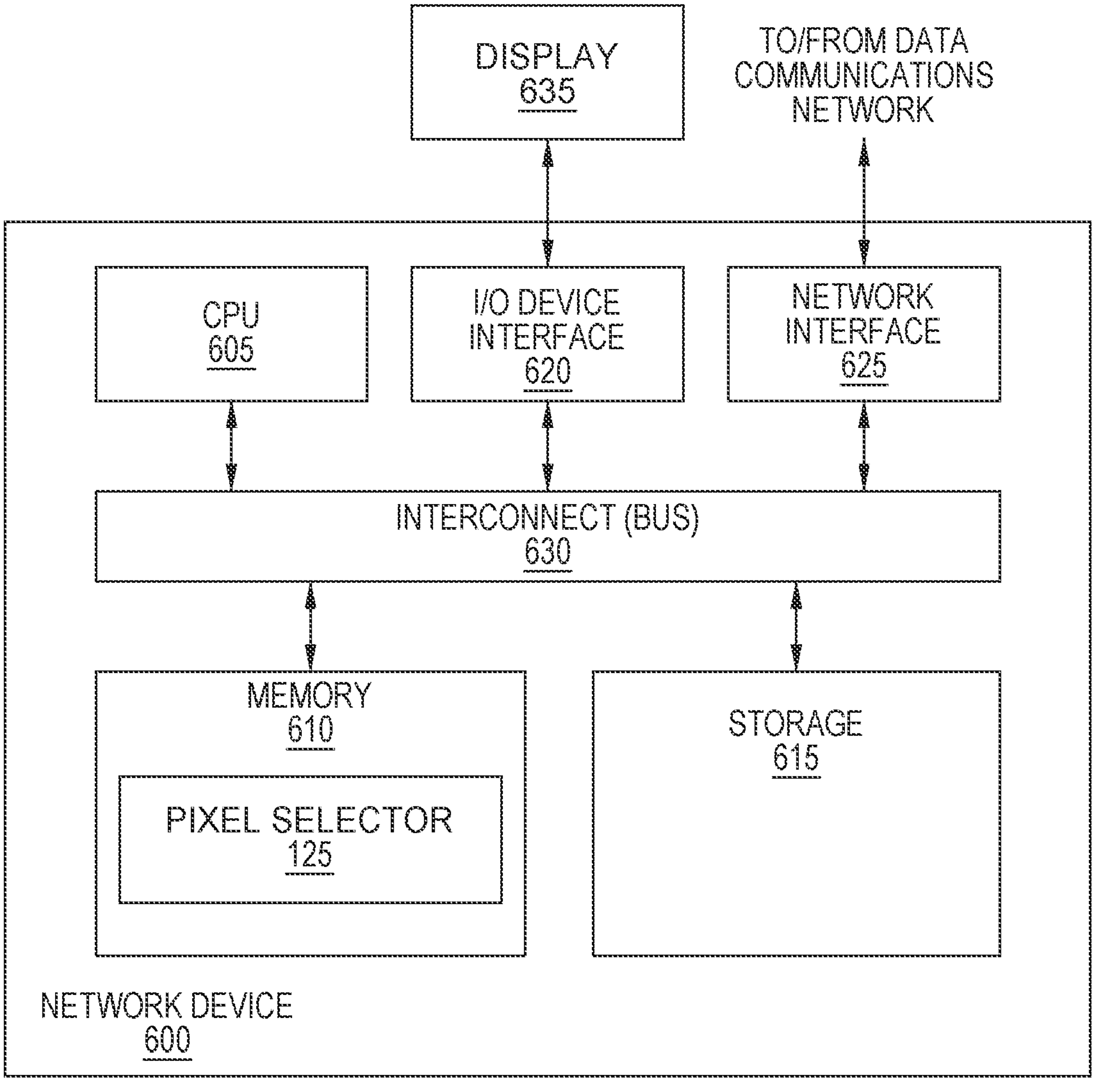
FIG. 6 depicts an example computing device configured to perform various aspects of the present disclosure, according to some embodiments of the present disclosure.

FIG. 6 depicts an example computing device (e.g., a host computing device 600) configured to perform various aspects of the present disclosure, according to some embodiments of the present disclosure. In some embodiments, the computing device 600 corresponds to a computing device that includes or implements the pixel selector 125 illustrated in FIG. 1. That is, rather than the pixel selector being implemented in a display 635, the logic for performing the image sticking prevention algorithms described above can be in a host computing device 600. Although depicted as a physical device, in embodiments, the computing device 600 may be implemented using virtual device(s), and/or across a number of devices (e.g., in a cloud environment).

As illustrated, the computing device 600 includes a CPU 605, memory 610, storage 615, a network interface 625, and one or more I/O interfaces 620. In the illustrated embodiment, the CPU 605 (e.g., one or more processors) retrieves and executes programming instructions stored in memory 610, as well as stores and retrieves application data residing in storage 615. The CPU 605 is generally representative of a single CPU and/or graphics processing unit (GPU), multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, the display 635 is connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes the pixel selector 125 (e.g., a software application), which may perform one or more embodiments discussed above in FIGS. 1-5 to mitigate image sticking. Although depicted as discrete components for conceptual clarity, in embodiments, the operations of the depicted components (and others not illustrated) may be combined or distributed across any number of components. Further, although depicted as software residing in memory 610, in embodiments, the operations of the depicted components (and others not illustrated) may be implemented using hardware, software, or a combination of hardware and software.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:

providing a display with pixels assigned to a plurality of groups;

monitoring each of the plurality of groups individually for a duration a first image has been displayed on the display and a duration that a voltage associated with the first image has remained constant and the same for the pixels;

determining a subset of the plurality of groups is experiencing image sticking; and responsive to determining the subset of the plurality of groups is experiencing image sticking, correcting the image sticking for each of the plurality of groups by repeatedly:

selectively de-energizing a subset of pixels in each of the plurality of groups for a period of time based on the duration the first image has been displayed on the display and the duration that the voltage associated with the first image has remained constant and the same for the pixels; and selecting a different subset of pixels in each of the plurality of groups to de-energize after the period of time expires.

2. The method of claim 1, wherein selectively de-energizing the subset of pixels comprises overriding display data indicating that the subset of pixels should be energized in order to output a second image on the display.

3. The method of claim 1, further comprising:

iteratively de-energizing different subsets of pixels in each of the groups until each pixel in the each of the plurality of groups has been de-energized.

4. The method of claim 1, further comprising:

reenergizing the subset of pixels after the period of time expires.

5. The method of claim 1, wherein the plurality of groups are non-overlapping.

6. The method of claim 5, wherein each of the plurality of groups comprises pixels from at least two rows and at least two columns.

7. The method of claim 1, further comprising:

testing the display to determine whether the display is experiencing, or is likely to experience, image sticking; and upon determining the display is not experiencing or is not likely to experience image sticking, powering every pixel in the display.

8. A non-transitory computer-readable storage medium having computer-readable program code embodied therewith, the computer-readable program code executable by a computer processor or a combination of computer processors to perform an operation, the operation comprises:

providing a display with pixels assigned to a plurality of groups;

monitoring each of the plurality of groups individually for a duration a first image has been displayed on the display and a duration that a voltage associated with the first image has remained constant and the same for the pixels;

determining a subset of the plurality of groups is experiencing image sticking; and responsive to determining the subset of the plurality of groups is experiencing image sticking, correcting the image sticking for each of the plurality of groups by repeatedly:

selectively de-energizing a subset of pixels in each of the plurality of groups for a period of time based on the duration the first image has been displayed on the display and the duration that the voltage associated with the first image has remained constant and the same for the pixels; and selecting a different subset of pixels in each of the plurality of groups to de-energize after the period of time expires.

9. The non-transitory computer-readable storage medium of claim 8, wherein selectively de-energizing the subset of pixels comprises overriding display data indicating that the subset of pixels should be energized in order to output a second image on the display.

10. The non-transitory computer-readable storage medium of claim 8, wherein the operation further comprises:

iteratively de-energizing different subsets of pixels in each of the groups until each pixel in the each of the plurality of groups has been de-energized.

11. The non-transitory computer-readable storage medium of claim 8, wherein the operation further comprises:

reenergizing the subset of pixels after the period of time expires.

12. The non-transitory computer-readable storage medium of claim 8, wherein the plurality of groups are non-overlapping.

13. The non-transitory computer-readable storage medium of claim 8, wherein the operation further comprises:

testing the display to determine whether the display is experiencing, or is likely to experience, image sticking; and upon determining the display is not experiencing or is not likely to experience image sticking, powering every pixel in the display.

14. A system, comprising:

a display with pixels assigned to a plurality of groups; and a pixel selector configured to:

monitor each of the plurality of groups individually for a duration a first image has been displayed on the display and a duration that a voltage associated with the first image has remained constant and the same for the pixels;

determine a subset of the plurality of groups is experiencing image sticking; and responsive to determining the subset of the plurality of groups is experiencing image sticking, correcting the image sticking for each of the plurality of groups by repeatedly:

selectively de-energizing a subset of pixels in each of the plurality of groups for a period of time based on the duration the first image has been displayed on the display and the duration that the voltage associated with the first image has remained constant and the same for the pixels; and select a different subset of pixels in each of the plurality of groups to de-energize after the period of time expires.

15. The system of claim 14, wherein selectively de-energizing the subset of pixels comprises overriding display data indicating that the subset of pixels should be energized in order to output a second image on the display.

16. The system of claim 14, wherein the pixel selector is configured to:

iteratively de-energize different subsets of pixels in each of the groups until each pixel in the each of the plurality of groups has been de-energized.

17. The system of claim 14, wherein the pixel selector is configured to:

reenergize the subset of pixels after the period of time expires.

18. The system of claim 14, wherein the plurality of groups are non-overlapping.

19. The system of claim 14, wherein a display controller is configured to:

test the display to determine whether the display is experiencing, or is likely to experience, image sticking; and upon determining the display is not experiencing or is not likely to experience image sticking, powering every pixel in the display.

20. The system of claim 14, wherein the display and the pixel selector are part of a point of sale (POS) system.

* * * * *